(12) United States Patent
Debe et al.

(10) Patent No.: US 8,012,284 B2
(45) Date of Patent: Sep. 6, 2011

(54) METHOD AND APPARATUS FOR FABRICATING ROLL GOOD FUEL CELL SUBASSEMBLIES

(75) Inventors: Mark K. Debe, Stillwater, MN (US); Andrew J. L. Steinbach, Minneapolis, MN (US); Jimmy M. Le, Saint Paul, MN (US); Stephan J. Obradovich, Menomonie, WI (US); Eric J. Iverson, Eau Claire, WI (US)

(73) Assignee: 3M Innovative Properties Company, St. Paul, MN (US)

( * ) Notice: Subject to any disclaimer, the term of this patent is extended or adjusted under 35 U.S.C. 154(b) by 1287 days.

(21) Appl. No.: 11/611,564

(22) Filed: Dec. 15, 2006

(65) Prior Publication Data

US 2008/0142152 A1 Jun. 19, 2008

(51) Int. Cl.
*B32B 37/02* (2006.01)
*B32B 37/06* (2006.01)
*B32B 37/10* (2006.01)
*B32B 37/14* (2006.01)
*B32B 37/18* (2006.01)

(52) U.S. Cl. ........ 156/182; 156/247; 156/540; 156/543; 156/60; 156/277; 156/387; 429/508; 429/509; 429/510; 429/463; 429/469

(58) Field of Classification Search .............. 156/247
See application file for complete search history.

(56) References Cited

U.S. PATENT DOCUMENTS

| | | | |
|---|---|---|---|
| 4,812,352 A | 3/1989 | Debe | |
| 5,879,827 A | 3/1999 | Debe et al. | |
| 6,136,412 A | 10/2000 | Spiewak et al. | |
| 6,291,091 B1 | 9/2001 | Preischl et al. | |
| 6,454,978 B1 | 9/2002 | Thielman | |
| 7,195,690 B2 | 3/2007 | Mekala et al. | |
| 7,504,173 B2 | 3/2009 | Kuroki et al. | |
| 7,732,083 B2* | 6/2010 | Steinbach et al. | ........... 29/623.4 |
| 2003/0003342 A1 | 1/2003 | Sugita et al. | |
| 2003/0008194 A1 | 1/2003 | Cargneli et al. | |

(Continued)

FOREIGN PATENT DOCUMENTS

EP 1 624 512 A2 2/2006

(Continued)

OTHER PUBLICATIONS

U.S. Appl. No. 11/224,879, filed Sep. 13, 2005, now pending, Titled: "Multilayered Nanostructured Films".

*Primary Examiner* — Philip C Tucker
*Assistant Examiner* — Vicki Wu
(74) *Attorney, Agent, or Firm* — Julie A. Lapos-Kuchar; Philip Y. Dahl

(57) ABSTRACT

Fabrication methods for making a gas diffusion layer incorporating a gasket (GIG) fuel cell subassemblies via roll-to-roll processes are described. A material processable by one or both of heat and pressure having spaced apart apertures is transported to a bonding station. A first gasket layer having gas diffusion layers arranged in relation to spaced apart apertures of a first gasket layer is transported to the bonding station. The heat/pressure processable material is aligned with the first gasket layer and the gas diffusion layers. At the bonding station, the heat/pressure processable material is bonded to the first gasket layer and the gas diffusion layers. After bonding, the heat/pressure processable material forms a second gasket layer that attaches the gas diffusion layers to the first gasket layer.

27 Claims, 10 Drawing Sheets

U.S. PATENT DOCUMENTS

| | | |
|---|---|---|
| 2003/0082430 A1 | 5/2003 | Suzuki |
| 2003/0191021 A1 | 10/2003 | Ripley et al. |
| 2003/0221311 A1* | 12/2003 | Smith et al. .................. 29/623.2 |
| 2004/0028983 A1 | 2/2004 | Hayashi et al. |
| 2004/0115513 A1 | 6/2004 | Yang |
| 2004/0241525 A1* | 12/2004 | Mekala et al. .................. 429/36 |
| 2005/0095490 A1 | 5/2005 | Mittelstadt et al. |
| 2005/0118491 A1 | 6/2005 | Ramsey et al. |
| 2005/0236765 A1 | 10/2005 | Puffer et al. |
| 2005/0244700 A1* | 11/2005 | Abd Elhamid et al. ......... 429/34 |
| 2006/0048540 A1 | 3/2006 | Voss et al. |
| 2006/0110647 A1 | 5/2006 | Sherman et al. |
| 2006/0127738 A1 | 6/2006 | Sompalli et al. |
| 2006/0141328 A1 | 6/2006 | Johnston et al. |
| 2006/0263558 A1* | 11/2006 | Crum ........................... 428/40.1 |
| 2007/0059452 A1 | 3/2007 | Debe et al. |

FOREIGN PATENT DOCUMENTS

| | | |
|---|---|---|
| KR | 2006/0000461 | 6/2006 |
| WO | WO 96/19015 | 6/1996 |
| WO | WO 2006/075867 A1 | 7/2006 |

* cited by examiner

METHOD AND APPARATUS FOR FABRICATING ROLL GOOD FUEL CELL SUBASSEMBLIES

FIELD OF THE INVENTION

The present invention relates generally to processes and apparatuses for automated fabrication of multiple layer fuel cell subassemblies in roll good form.

BACKGROUND OF THE INVENTION

Various apparatuses and methods have been developed to produce fuel cells from components developed in web or roll form. Conventional assembling approaches typically involve cutting several of the input web components to form stacks of such material in batch operations. The materials are then manipulated using various mechanical and vacuum means to properly position the materials during fuel cell assembly.

Although many of these processes can be automated, such approaches typically involve numerous handling, registration, and alignment steps performed by complex, time consuming, and typically expensive automation equipment. The number and complexity of processing steps associated with conventional fuel cell manufacturing approaches typically reduces product throughput, which negatively affects the productivity of an automated fuel cell assembly line. Moreover, many conventional fuel cell fabrication apparatuses and methods are not well suited for a high degree of automation, particularly such apparatus and processes which have tight positional tolerance requirements.

There is a need for improved fuel cell manufacturing apparatuses, methodologies, and fuel cell subassemblies produced from such apparatuses and methodologies. There is a further need for such apparatuses, methodologies, and fuel cell subassemblies that can be implemented in an automated assembly environment, such as in an automated fuel cell assembly plant. The present invention fulfills these and other needs, and addresses other deficiencies in prior approaches.

SUMMARY OF THE INVENTION

Embodiments of the invention are directed to fuel cell fabrication processes and equipment. Various embodiments exemplify automated fabrication of multiple layer fuel cell subassemblies in roll-good form, including gas diffusion layers incorporating gaskets and/or membrane electrode assemblies (MEAs) in roll-good form.

One embodiment of the present invention is directed to a method of making gas diffusion layer incorporating a gasket (GIG) fuel cell subassemblies via a roll-to-roll process. A gasket material (referred to herein as a heat/pressure processable material) having spaced apart apertures is transported to a bonding station. A first gasket layer having gas diffusion layers arranged in relation to spaced apart apertures of the first gasket layer is transported to the bonding station. The heat/pressure processable material is aligned with the first gasket layer and the gas diffusion layers. At the bonding station, the heat/pressure processable material is bonded to the first gasket layer and the gas diffusion layers. After bonding, the heat/pressure processable material forms a second gasket layer that attaches the gas diffusion layers to the first gasket layer. In some implementations, the gas diffusion layers comprise catalyst coated gas diffusion layers.

In one implementation, the apertures of the heat/pressure processable material are aligned with the apertures of the first gasket layer so that the heat/pressure processable material overlaps at least a portion of the first gasket layer and gas diffusion layers. The gas diffusion layers are typically disposed within the spaced apart apertures of the first gasket layer.

The heat/pressure processable material and/or the first gasket layer and gas diffusion layers may be transported, respectively, on first and second carrier webs. In one application, the heat/pressure processable material is adhered to the first carrier web via a first adhesive and the first gasket layer and the gas diffusion layers are adhered to the second carrier web via a second adhesive, such as a heat deactivated pressure sensitive adhesive. Removing the second carrier web exposes an adhesive layer or an adhesive liner of the first gasket layer.

The heat/pressure processable material is bonded to the gas diffusion layers and the first gasket layer by application of at least one of heat and pressure to the heat/pressure processable material via bonding rollers in a continuous process.

Another embodiment of the invention is directed to a method of membrane electrode assemblies via a roll-to-roll process. First and second GIGs are formed by bonding heat/pressure processable material to the first gasket layer and the gas diffusion layers. An adhesive layer is exposed on the first gasket layer of each GIG. One or more electrolyte membranes are delivered from an unwind wheel. The first and second GIGs are bonded to the surfaces of the one or more electrolyte membranes.

According to one aspect of the invention, the one or more electrolyte membranes are at least partially catalyst coated. According to another aspect of the invention, the gas diffusion layers of the first and second GIGs are at least partially catalyst coated. The one or more electrolyte membranes may comprise a continuous membrane web or may be a plurality of discrete membranes arranged on a carrier web or may be a continuous membrane web having patterned catalyst areas. In the case of discrete or patterned membranes, the first and second GIGs are aligned with the discrete membranes or patterned areas prior to bonding.

If used, the adhesive liners of the GIGs are removed from the adhesive prior to bonding. The first and second GIGs are bonded to the electrolyte membrane via the adhesive. In some implementations, the first and second GIG subassemblies are bonded to each other via their respective adhesive layers. According to some implementations, the adhesive layers may comprise a pressure sensitive adhesive.

Bonding the heat/pressure processable material to the gas diffusion layers and the first gasket layer may involve applying one or both of heat and pressure to the heat/pressure processable material, the gas diffusion layers and the first gasket layer via bonding rollers in a continuous process.

The first GIG may be bonded to the electrolyte membrane via a first set of rollers and the second GIG may be bonded to the electrolyte membrane via a second set of rollers. After bonding, the first and second carrier webs may be removed and the electrolyte membrane having the first and second GIG subassemblies bonded thereto may be cut into individual membrane electrode assemblies.

Another embodiment of the invention is directed to an apparatus for continuously producing fuel cell subassemblies. The apparatus includes a transport system configured to move a heat/pressure processable material and a first gasket layer having gas diffusion layers disposed within spaced apart apertures of the first gasket layer, the heat/pressure processable material disposed on a first carrier web and the first gasket layer and the gas diffusion layers disposed on a second carrier web. An alignment system aligns the apertures of the heat/pressure processable material with the apertures of the first gasket layer and the gas diffusion layers. A bonding station bonds the heat/pressure processable material to the gas diffusion layers and the first gasket layer. After bonding, the heat/pressure processable material forms a second gasket layer that attaches the gas diffusion layers to the first gasket layer.

In some implementations, a first adhesive adheres the heat/pressure processable material to the first carrier web and a heat deactivated adhesive adheres the first gasket layer and the gas diffusion layers to the second carrier web. A delaminating station removes the second carrier web from the gas diffusion layers and the first gasket layer, removal of the second carrier web exposing an adhesive layer or an adhesive release liner of the first gasket layer.

Yet another embodiment is directed to an apparatus for continuously producing fuel cell membrane electrode assemblies. The apparatus includes first and second systems configured to produce first and second gasketed gas diffusion layer (GIG) subassemblies An electrolyte membrane transport system moves one or more electrolyte membranes in a continuous roll-to-roll process. A membrane bonding station bonds the first and second GIGs to the one or more electrolyte membranes.

In one implementation, bonding the first and second GIGs to surfaces of the one or more membranes may be performed by first and second bonding stations. In another implementation, the first and second GIG subassemblies are bonded to the one or more electrolyte membranes substantially concurrently, such as by a single pair of bonding rollers. If necessary, a membrane alignment system is used to align one or both of the first and second GIG subassemblies with the one or more membranes.

Another embodiment of the invention is directed to a method of making gas diffusion layer incorporating a gasket (GIG) fuel cell subassemblies via a roll-to-roll process. A first gasket layer having spaced apart apertures is transported to a deposition station where a heat/pressure processable material is deposited on the first gasket layer. The first gasket layer having the heat/pressure processable material disposed thereon is aligned with gas diffusion layers. At a bonding station, the heat/pressure processable material is bonded to the first gasket layer and the gas diffusion layers. The heat/pressure processable material, after bonding, forms a second gasket layer that attaches the gas diffusion layers to the first gasket layer.

In one configuration, the gas diffusion layers are aligned with the first gasket layer so that the gas diffusion layers are within the apertures of the first gasket layer. In another configuration, the gas diffusion layers may be aligned so that they overlap the heat/pressure processable material.

Another embodiment of the invention involves an apparatus for producing fuel cell subassemblies. A transport system moves a web including a first gasket layer having spaced apart apertures and a web including gas diffusion layers. A deposition system deposits a material processable by one or both of heat and pressure on the first gasket layer. An alignment system aligns the gas diffusion layers and the first gasket layer having the heat/pressure processable material disposed thereon. A bonding station bonds the heat/pressure processable material to the gas diffusion layers and the first gasket layer. The heat/pressure processable material, after bonding, forms a second gasket layer that attaches the gas diffusion layers to the first gasket layer.

The above summary of the present invention is not intended to describe each embodiment or every implementation of the present invention. Advantages and attainments, together with a more complete understanding of the invention, will become apparent and appreciated by referring to the following detailed description and claims taken in conjunction with the accompanying drawings.

Figure 1:
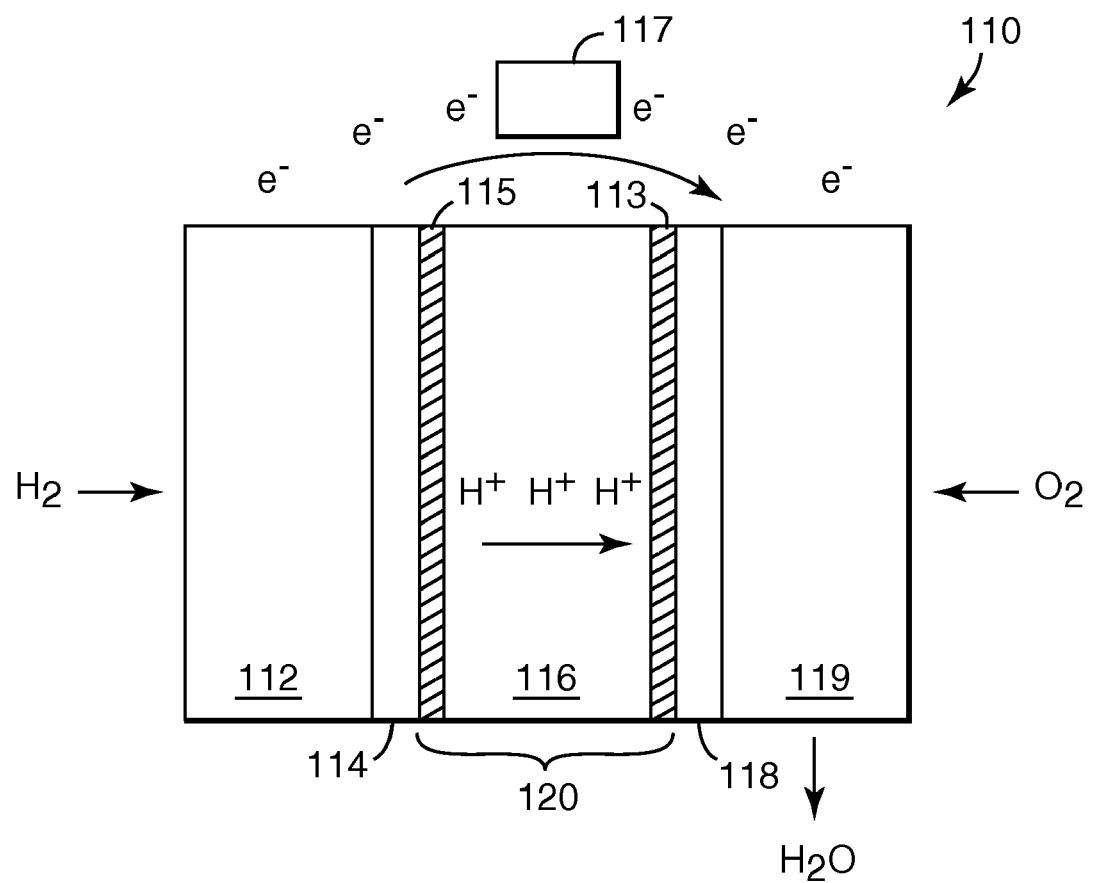
FIG. 1 depicts a typical fuel cell and its basic operation.

While the invention is amenable to various modifications and alternative forms, specifics thereof have been shown by way of example in the drawings and will be described in detail. It is to be understood, however, that the intention is not to limit the invention to the particular embodiments described. On the contrary, the intention is to cover all modifications, equivalents, and alternatives falling within the scope of the invention as defined by the appended claims.

DETAILED DESCRIPTION OF VARIOUS EMBODIMENTS

In the following description of the illustrated embodiments, reference is made to the accompanying drawings which form a part hereof, and in which is shown by way of illustration, various embodiments in which the invention may be practiced. It is to be understood that the embodiments may be utilized and structural changes may be made without departing from the scope of the present invention.

Embodiments of the present invention are directed to methods and apparatuses for constructing fuel cell subassemblies. In various embodiments, subassemblies involving multiple gas diffusion layers incorporating gaskets (GIGs) are formed as a roll good. The roll good GIGs subassemblies may be subsequently used to fabricate roll good MEA subassemblies that may in turn be combined with flow field plates and other components to produce complete fuel cells.

A fuel cell is an electrochemical device that combines hydrogen fuel and oxygen from the air to produce electricity, heat, and water. Fuel cells do not utilize combustion, and as such, fuel cells produce little if any hazardous effluents. Fuel cells convert hydrogen fuel and oxygen directly into electricity, and can be operated at much higher efficiencies than internal combustion electric generators, for example.

The GIG and MEA subassemblies illustrated by various embodiments described herein are particularly useful in the fabrication of polymer electrolyte membrane (PEM) fuel cells. A typical fuel cell configuration is depicted in FIG. 1. The fuel cell 110 shown in FIG. 1 includes a first fluid flow plate 112 adjacent a first GIG 114. Adjacent the GIG 114 is a catalyst coated electrolyte membrane (CCM) 120. A second GIG 118 is situated adjacent the CCM 120, and a second fluid flow plate 119 is situated adjacent the second GIG 118.

In operation, hydrogen fuel is introduced into the anode portion of the fuel cell 110, passing over the first fluid flow plate 112 and through the GDL portion of the first GIG 114. At the interface of the GDL of the first GIG 114 and the CCM 120, on the surface of the catalyst layer 115, the hydrogen fuel is separated into hydrogen ions ($H^+$) and electrons ($e^-$).

The electrolyte membrane 116 of the CCM 120 permits only the hydrogen ions or protons to pass through the electrolyte membrane 116 to the second GIG 118 of the fuel cell 110. The electrons cannot pass through the electrolyte membrane 116 and, instead, flow through an external electrical circuit in the form of electric current. This current can power an electric load 117, such as an electric motor, or be directed to an energy storage device, such as a rechargeable battery.

Oxygen flows through the GDL portion of the second GIG 118 at the cathode side of the fuel cell 110 via the second fluid flow plate 119. On the surface of the cathode catalyst layer 113, oxygen, protons, and electrons combine to produce water and heat.

Individual fuel cells, such as that shown in FIG. 1, can be combined with a number of other fuel cells to form a fuel cell stack. The number of fuel cells within the stack determines the total voltage of the stack, and the active area of each of the cells determines the total current. The total electrical power generated by a given fuel cell stack can be determined by multiplying the total stack voltage by total current.

Roll good subassemblies used in the formation of fuel cells, such as the fuel cell 110 shown in FIG. 1, can be produced from roll good input materials (e.g., webs of fuel cell components) in accordance with embodiments of the present invention. For example, roll good GIGs and/or roll good MEAs incorporating GIGs can be fabricated using a continuous assembling approach by which roll good input web materials are processed to produce a roll good output web. In certain approaches, roll good input web materials can be processed to produce a roll good output web of fuel cell subassemblies comprising GIGs, which can then be used in a subsequent process to produce roll good MEA subassemblies and/or complete fuel cell assemblies.

Output fuel cell subassembly webs can be wound with appropriate liner material to form a roll. In another approach, output fuel cell subassembly webs can be subject to a singulation process, by which individual fuel cell subassemblies are separated from their respective webs. In some approaches, roll-good GIG subassemblies can be processed to produce MEA subassemblies in a continuous manner.

Figure 2A:
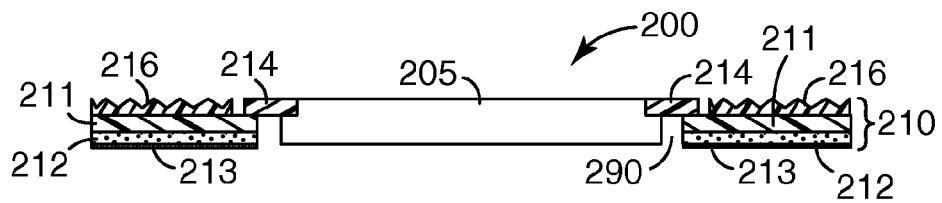
FIGS. 2A and 2B are cross sectional view and plan views, respectively, of a gas diffusion layer incorporating a gasket (GIG) constructed in accordance with an embodiment of the present invention.
Figure 2B:
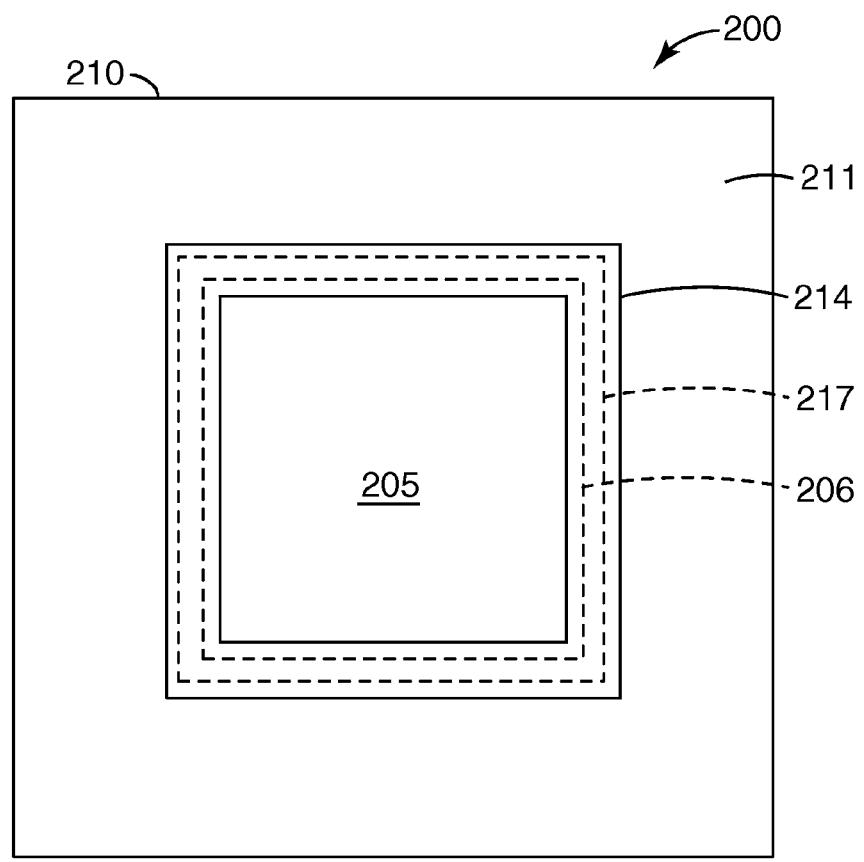

FIGS. 2A and 2B provide cross sectional and plan views, respectively, of a GIG 200 in accordance with one embodiment. The GIG 200 includes a gasket 210 and gas diffusion layer (GDL) 205. The GDL 205 can be made of any material capable of collecting electrical current from the electrode while allowing reactant gasses to pass through, typically a woven or non-woven carbon fiber paper or cloth.

The gasket 210 is a layered structure including a first gasket layer 211 positioned relative to the GDL 205. In one embodiment, as best seen in FIG. 2A, the GDL 205 is slightly smaller than an aperture 290 in the first gasket layer 211. In this embodiment, the GDL 205 is positioned within the aperture 290 of the first gasket layer 211. The first gasket layer 211 may comprise various types of polymer material, such as polyimide, polyethylene naphthalate (PEN), polyethylene telephthalate (PET) and/or other similar materials, including rigid polymeric materials that are sufficiently thin, sufficiently strong, and sufficiently compatible with the fuel cell environment, i.e., temperatures of 80-100° C., in the presence of water, hydrogen and/or oxygen.

The gasket 210 includes an adhesive layer 212 disposed on one surface of the first gasket layer 211 and optionally includes an adhesive liner 213. The material of the first gasket layer 211 and the adhesive layer 212 are selected so that the adhesive layer 212 adheres well to the first gasket layer 211. The adhesive layer 212 may comprise a pressure sensitive adhesive (PSA) or heat activated adhesive. For example, the adhesive layer 212 may comprise any of the following: acrylic PSA's, rubber based adhesives, ethylene maleic anhydride copolymers, olefin adhesives such as copolymers of 1-octene with ethylene or propylene, nitrile based adhesives, epoxy based adhesives, and urethane based adhesives. In some embodiments, the adhesive layer 212 may comprise a thermally activated adhesive, such as Thermobond 845 (polyethylene maleate based) or Thermobond 583 (nitrile rubber based).

The gasket 210 includes a second gasket layer 214 that bonds together the GDL 205 and the first gasket layer 211. In various embodiments discussed herein, the second gasket layer 214 may be formed from a material that is solid at room temperature and is processed by heat and/or pressure to form the bond between the GDL 205 and the first gasket layer 211. Application of heat and/or pressure to the material may cause the material to flow or to deform sufficiently to form the bond between the GDL 205 and the first gasket layer 211. The material used to form the second gasket layer 214 is referred to herein as a heat/pressure processable material. Suitable materials for formation of the second gasket layer include, for example, heat processable polymers or thermoplastic sealing materials. The thermoplastic materials can be a fluoroplastic like THV (terpolymer of tetrafluoroethylene, hexafluoropropylene and vinylidene difluoride), polyethylene, copolymers of polyethylene such as those of ethylene and acrylic acid, Thermo-Bond 845 (manufactured by 3M, e.g., a polyethylene maleic anhydride copolymer) and Thermo-Bond 668 (manufactured by 3M, e.g., a polyester). Blends of these materials or composite materials of these with fillers such as carbon, glass, ceramic, etc. may also be used as thermoplastics. The melt range may be about 50-180° C., for example, or may be about 100-150° C.

In one embodiment, a surface of the first gasket layer 211 and/or the second gasket layer 214 may include surface features such as microstructured features 216. In some fuel cell configurations, the microstructured features 216 enhance the sealing properties of the GIG. The microstructured features 216 may be formed in a variety of shapes including closely packed hexagons, or any other shape. In certain embodiments, the height of the microstructured features 216 can be chosen to fit a unipolar flow field plate where the sealing surface of the GIG is co-planar with the top of the flow field, or where the sealing surface is recessed some amount. The recessed version allows the microstructured features 216 to be taller, allowing for increased seal tolerance in the presence of inhomogeneities in plate thickness. In some instances, the preferred surface feature 216 of the first and/or second gasket layers 211, 214 is substantially flat to facilitate bonding to a fuel cell stack flow field plate that has appropriate ridges for making the seal.

Figure 2C:
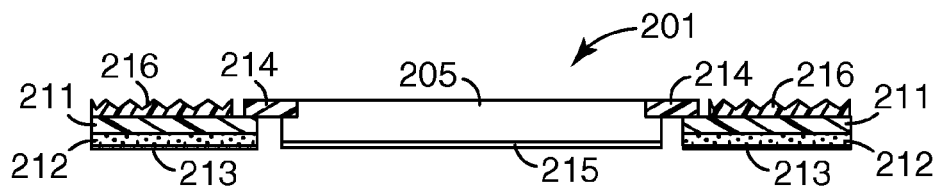
FIG. 2C is a cross sectional view of a GIG including a catalyst coated GDL in accordance with an embodiment of the present invention.

In one configuration, a heat/pressure processable material is used to form the second gasket layer 214. The GDL 205 is disposed within an aperture 290 of the first gasket layer 211. A heat/pressure processable material that is used to form the second gasket layer 214 is cut into a frame having an aperture and is placed over an outer edge 206 (FIG. 2B) of the GDL 205 and an inner edge 217 of the first layer gasket 211. After placement heat and/or pressure are applied to the subassembly, causing some of the heat/pressure processable material to flow into the adjacent edge and/or surface of the GDL 205 and into the adjacent edge and/or surface of the first gasket layer 211. Application of heat and/or pressure causes the second gasket layer 214 to adhere to both the first gasket layer 211 and the GDL 205, thus attaching the first gasket layer 211 to the GDL 205. The surface of the compression tool used for the hot press may have the microstructure features on it (in negative) to develop microstructured features on the surface of the first and/or second gasket layers 211, 214. In some embodiments the GDL 205 of a GIG 201 may additionally include a catalyst layer 215 disposed on one surface, as illustrated in FIG. 2C.

Figure 2D:
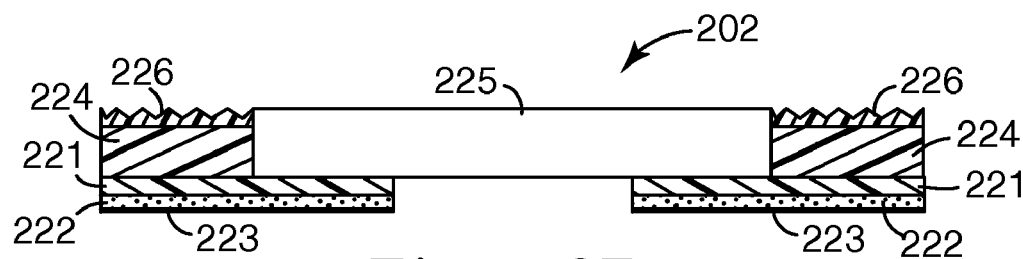
FIGS. 2D and 2E are cross sectional views of GIGs where the first gasket layer is disposed under the GDL in accordance with embodiments of the invention.
Figure 2E:
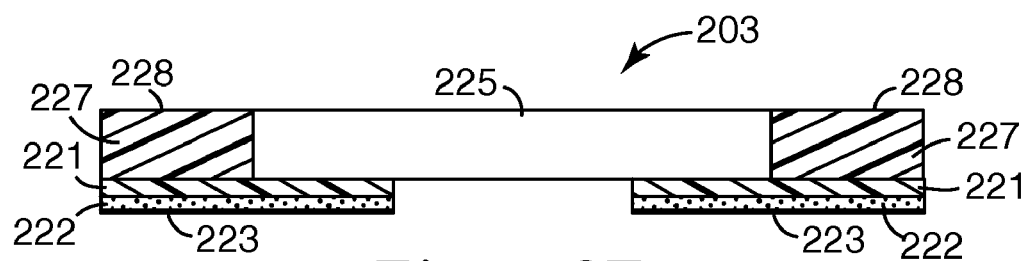

FIG. 2D and 2E illustrate embodiments where the first gasket layer 221, having an adhesive layer 222 and optional adhesive liner 223, is positioned under the GDL 225. In the embodiment illustrated in FIGS. 2D and 2E, the second gasket layer 224 is disposed on the first gasket layer 221 adjacent the GDL 225. In some implementations, the material that forms the second gasket layer 224 may overlap the top surface of the GDL 225. The second gasket 224 layer may include microstructured features 226 (FIG. 2D) or have a substantially flat sealing surface 228 (FIG. 2E).

In some embodiments, the GIG is assembled by placing or depositing the heat/pressure processable gasket material used to form the second gasket layer on the first gasket layer prior to arrangement of the GDLs on the first gasket layer. For example, the heat/pressure processable gasket material may be screen printed or deposited by other methods on the surface of the first gasket layer. The GDL is then positioned over the first gasket layer. In some implementations, a portion of the gasket material of the second gasket layer may be disposed between the GDL and the first gasket layer. After placement of the GDL, heat and/or pressure are applied to the subassembly, causing some of the heat/pressure processable material to flow into the adjacent edge and/or surface of the GDL and/or into the adjacent edge and/or surface of the first gasket layer.

Figure 2F:
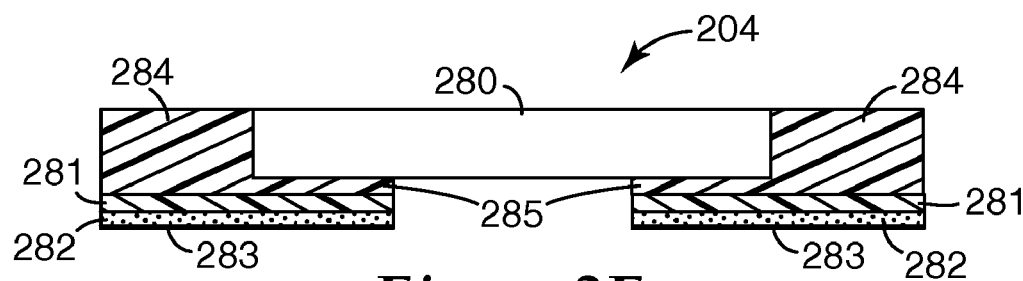
FIG. 2F is a cross sectional view of a GIG where a portion of the heat/pressure processable material used for the second gasket layer is disposed between the first gasket layer and the GDL in accordance with embodiments of the invention.

FIG. 2F illustrates a GIG 204 that may be formed according the above-described process. In this implementation, some of the heat/pressure processable material 285 of the second gasket layer is disposed between the GDL 280 and the first gasket layer 281. The first gasket layer 281 includes an adhesive layer 282 and optional adhesive liner 283. The second gasket layer 284 may include microstructured features, or may be substantially flat, as illustrated in FIG. 2F.

Methods and apparatuses for fabrication of the GIGs 200, 201, 202, and/or 203 are described below. Further details regarding GIGs and MEAs and/or fuel cells incorporating GIGs are described in commonly owned U.S. Patent Publ. No. 2008/0143061, filed concurrently with the present application, and incorporated herein by reference.

Figure 3A:
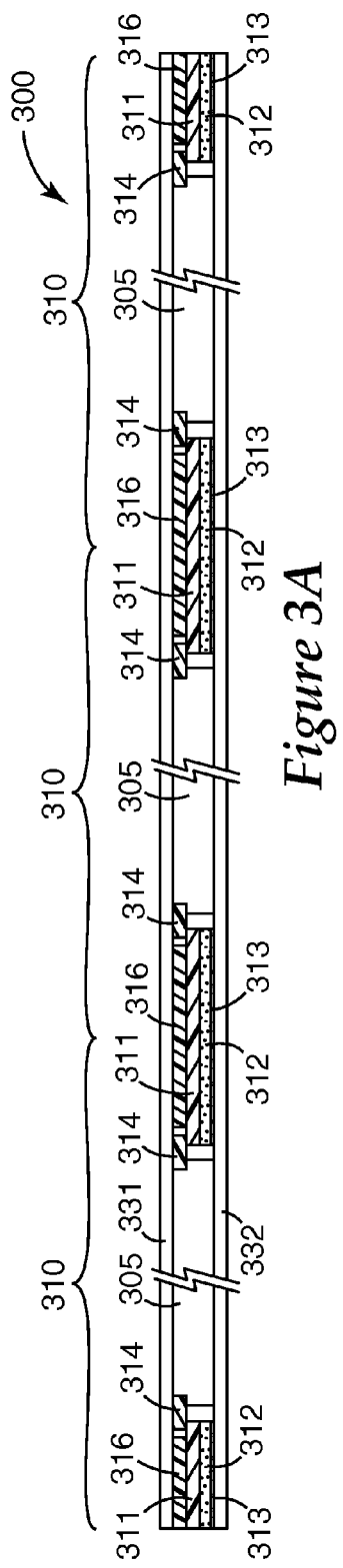
FIG. 3A is a cross sectional view of a GIG subassembly web comprising a plurality of GIGs sandwiched between first and second carrier webs formed in accordance with one embodiment.

A web comprising a plurality of GIGs, such as those illustrated in FIGS. 2A-2C, may be fabricated as a GIG subassembly web in a roll-to-roll process. FIG. 3A illustrates a cross sectional view of GIG subassembly web 300 comprising a plurality of GIGs 310 in accordance with one embodiment. To facilitate handling and transport the GIG subassembly components, the heat/pressure processable material that forms the second gasket layer 314 may be disposed on a first carrier web 331 and the first gasket layer may be disposed on a second carrier web 332 during the fabrication process.

Figure 3B:
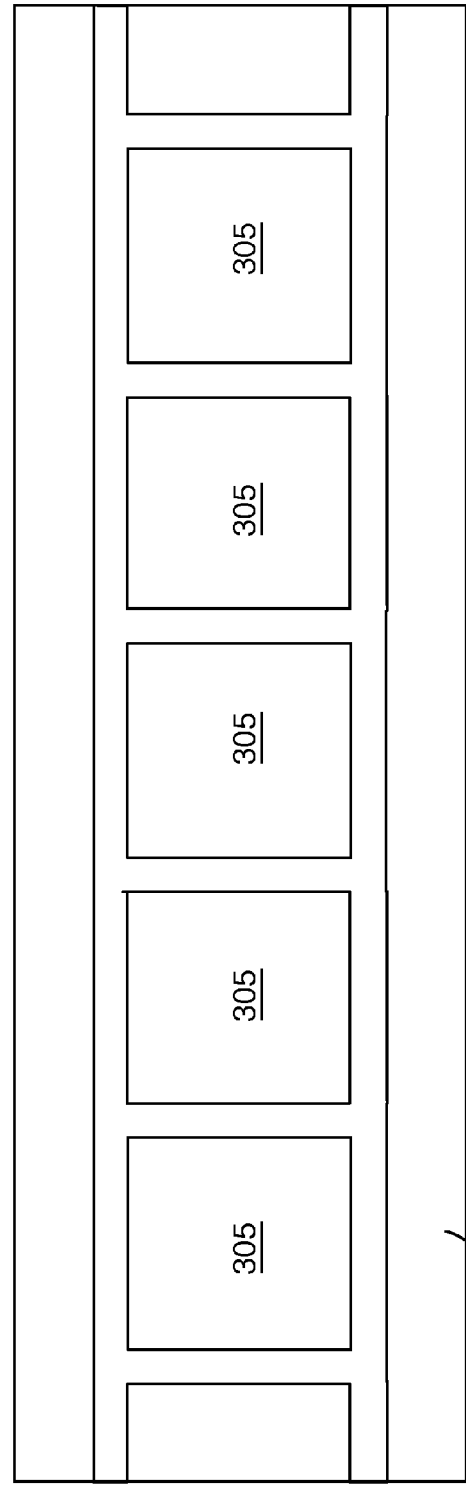
FIG. 3B is a plan view of the GIG subassembly web of FIG. 3A absent the first carrier web in accordance with embodiments of the invention.

During fabrication, the heat/pressure processable material that forms the second gasket layer 314 is brought together with the first gasket material 311 and GDLs 305 at a compression device, such as a pair of bonding rollers, through movement of the first and second carrier webs 331, 332. At the bonding rollers, heat and/or pressure are applied to the heat/pressure processable material causing the material to flow or deform, forming the second gasket layer 314 which bonds the first gasket material 311 to the GDLs 305. Each GIG 310 may have a flat gasket surface or may have a gasket surface that includes microstructured features 316. An adhesive layer 312 and optional adhesive liner 313 are disposed on the first gasket layer 311. FIG. 3B illustrates in plan view (not to scale) of a GIG subassembly web including the second carrier web 332 and absent the first carrier web.

Figure 3C:
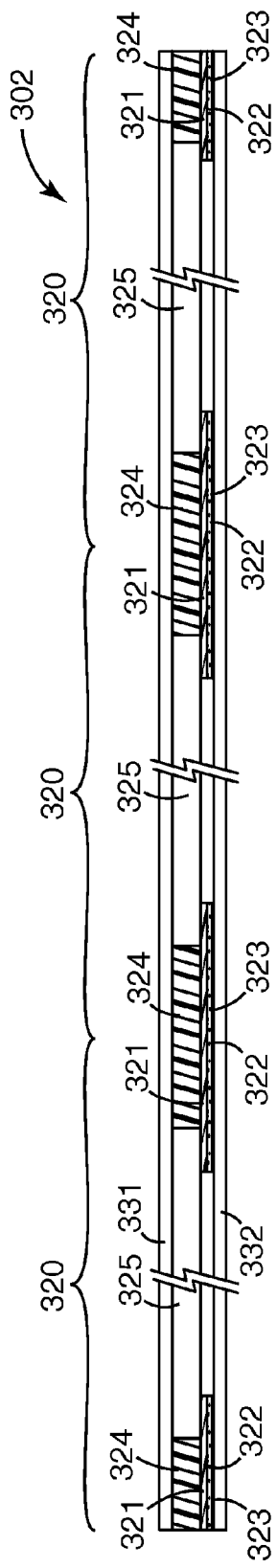
FIG. 3C is a cross sectional view of a GIG subassembly web comprising a plurality of GIGs sandwiched between first and second carrier webs where the GDL overlaps the first gasket layer in accordance with one embodiment.

A web comprising a plurality of GIGs, such as those illustrated in FIGS. 2D-2E, is illustrated in FIG. 3C. FIG. 3C illustrates a cross sectional view of GIG web 302 comprising a plurality of GIGs 320 in accordance with one embodiment. To facilitate handling and transport the GIG subassembly components, the heat/pressure processable material that forms the second gasket layer 324 may be disposed on a first carrier web 331 and the first gasket layer may be disposed on a second carrier web 332 during the fabrication process.

During fabrication, the heat/pressure processable material that forms the second gasket layer 324 is brought together with the first gasket layer 321 and GDLs 325 at a compression device, such as a pair of bonding rollers, through movement of the first and second carrier webs 331, 332. At the bonding rollers, heat and/or pressure are applied to the heat/pressure processable material causing the material to flow or deform, forming the second gasket layer 324 which bonds the first gasket layer 321 to the GDLs 325. An adhesive layer 322 and optional adhesive liner 323 are disposed on the first gasket layer 321.

Figure 4A:
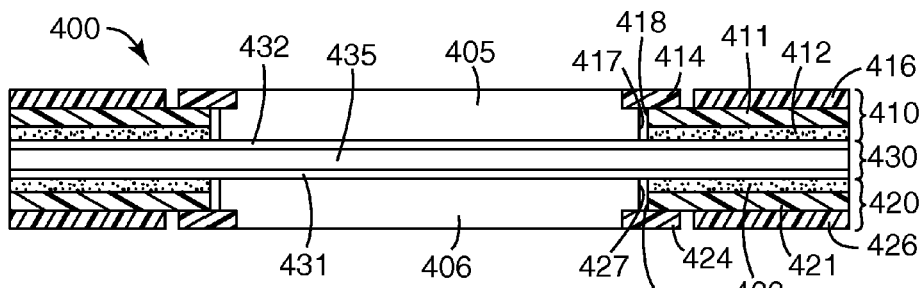
FIG. 4A illustrates a membrane electrode assembly (MEA) including GIGs disposed on first and second surfaces of a catalyst coated electrolyte membrane (CCM) in accordance with embodiments of the invention.
Figure 4B:
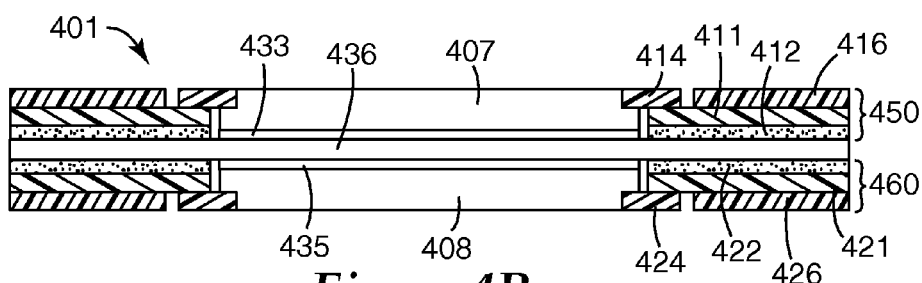
FIG. 4B illustrates an MEA including GIGs having catalyst coated GDLs disposed on an electrolyte membrane without catalyst layers in accordance with embodiments of the invention.

In certain embodiments, GIGs and/or GIG subassembly webs fabricated according to the processes described above and depicted in FIGS. 2A-3C may be used in subsequent processes to form individual MEAs or MEA subassembly webs. FIGS. 4A and 4B illustrate MEAs fabricated using GIGs disposed on first and second surfaces of an electrolyte membrane. FIG. 4A illustrates GIGs 410, 420 disposed on first and second surfaces of a catalyst coated electrolyte membrane (CCM) 430. Each GIG 410, 420 includes a first gasket layer 411, 421 that may or may not include microstructured features 416, 426. An adhesive layer 412, 422 is disposed on each of the first gasket layers 411, 421. Each of the first gasket layers 411, 421 of GIGs 410, 420 have apertures with GDLs 405, 406 arranged within the apertures.

The GDLs 405, 406 illustrated in FIG. 4A are slightly smaller than the apertures of the first gasket layers 411, 421 so that the GDLs 405, 406 fit within the apertures of first gasket layers 411, 421. In some embodiments, the GDLs 405, 406 may be slightly larger than the apertures of the first gasket layers 411, 421 so that outer edges 417, 427 of the GDLs 405, 406 overlap the inner edges 418, 428 of the first gasket layers 411, 421. Each GIG includes a second gasket layer 414, 424 formed from a heat/pressure processable material.

After application of heat and pressure, the heat/pressure processable material flows or deforms to form the second gasket layer 414, 424 that bonds the first gasket layer 411, 421 and the GDL 405, 406. During the bonding process, microstructured features may be imparted to the second gasket layer 414 and/or the first gasket layer 411 to enhance the sealing properties of the GIG 401.

FIG. 4B illustrates an MEA 401 similar to the one illustrated in FIG. 4A except that the GIGS 450, 460 include catalyst layers 433, 434 on the surfaces of the GDLs 407, 408 adjacent the electrolyte membrane 436. In this embodiment, the electrolyte membrane 436 may or may not include catalyst layers.

Figure 4C:
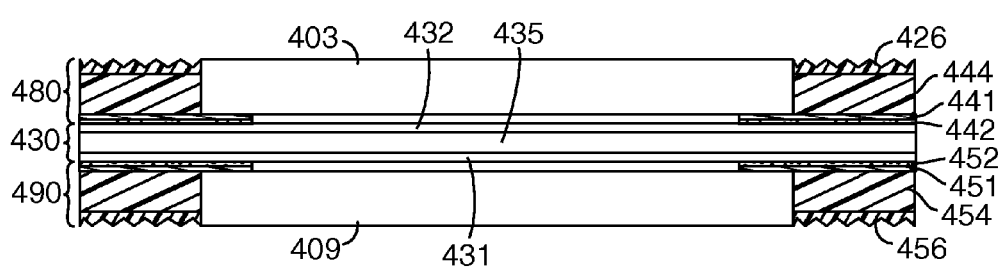
FIG. 4C illustrates a membrane electrode assembly (MEA) including GIGs wherein the GDLs overlap the first gasket layer of the GIGs in accordance with embodiments of the invention.

FIG. 4C illustrates GIGs 480, 490 disposed on first and second surfaces of a catalyst coated electrolyte membrane (CCM) 430 having a membrane 435 and catalyst layers 431, 432. Each GIG 480, 490 includes a first gasket layer 441, 451. An adhesive layer 442, 452 is disposed on each of the first gasket layers 441, 451. In this embodiment, the GDLs 403, 404 overlap the first gasket layers 441, 451. Each GIG 480, 490 includes a second gasket layer 444, 454 formed from a heat/pressure processable material. In this embodiment, the second gasket layers 444, 454 include microstructured features 446, 456 although in other embodiments, the surface of the second gasket layer may be substantially flat.

Figure 5:
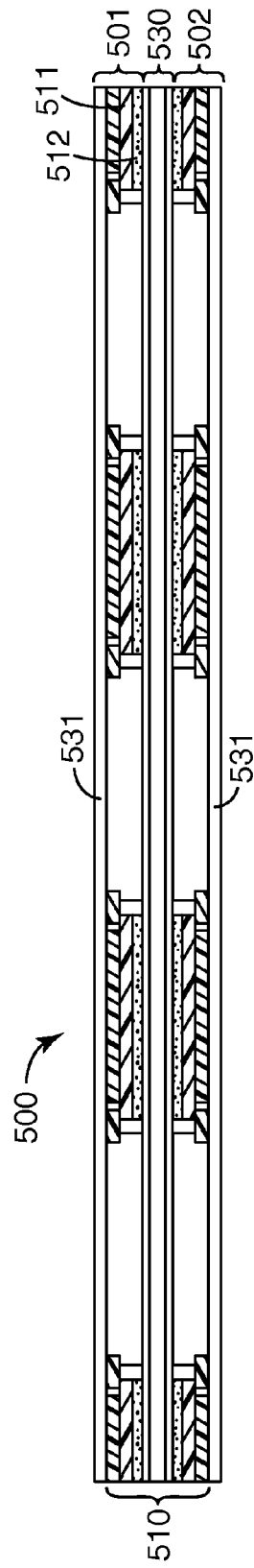
FIG. 5 is a cross sectional view of a multi-MEA subassembly web in accordance with embodiments of the invention.

FIG. 5 illustrates a cross sectional view of an MEA subassembly web 500 comprising a plurality of MEAs 510 which may be fabricated by a roll-to-roll manufacturing process in accordance with one embodiment. The MEA subassembly web 500 may be fabricated using two GIG subassembly, webs as illustrated in FIG. 3A, following removal of the second carrier web and the adhesive liner, if used, from each GIG subassembly. One of the GIG subassemblies 501 is adhesively bonded to one surface of the CCM 530 via the adhesive layer 512 of the first gasket layer 511. Another of the GIG subassemblies 502 is adhesively bonded to the opposite surface of the CCM 530 to form the MEA subassembly web 500. The process leaves the first carrier webs 531 of each of the GIG subassemblies webs 501, 502 intact which may facilitate handling of the MEA subassembly web 500 in subsequent processing steps.

Figure 6:
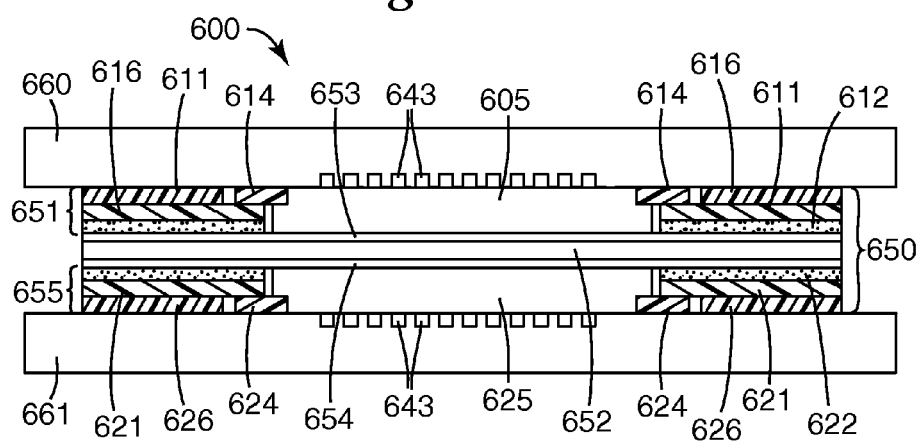
FIG. 6 is a single fuel cell including an MEA incorporating GIGs in accordance with embodiments of the invention.

Referring now to FIG. 6, there is illustrated a cross sectional view of a single cell assembly of a fuel cell stack 600 in accordance with an embodiment of the invention. The fuel cell stack comprises a five layer MEA 650, incorporating two GIGs 651, 655 as described above, sandwiched between fluid flow plates 660, 661.

Fabrication of fuel cells including MEAs and flow field plates may be accomplished by a roll to roll process. Methods and devices useful in roll to roll fuel cell fabrication, including flow field separator plates suitable for roll to roll processing, are described in commonly owned U.S. Patent Publication No. 20060141328 which is incorporated herein by reference in its entirety.

The MEA 650 of the fuel cell 600 includes an electrolyte membrane 652 between anode 653 and cathode 654 catalyst layers. In some configurations, one or both of the anode 653 and cathode 654 catalyst layers may be disposed on the surfaces of the electrolyte membrane 652 forming a catalyst coated membrane (CCM). In other configurations, as previously illustrated in FIG. 4B, the catalyst layers 653, 654 may be disposed on the surface of the GDLs 605, 625. In yet other configurations, the catalyst layers 653, 654 may be disposed partially on the electrolyte membrane 652 and partially on the GDLs 605, 625.

The anode and cathode catalyst layers 653, 654 are disposed between the electrolyte membrane 652 and GIGs 651, 655 configured as described herein. Each GIG 651, 655 includes a GDL 605, 625 a first gasket layer 611, 621 adhesive layer 612, 622 and second gasket layer 614, 624 that bonds the first gasket layer 611, 621 to the GDL 605, 625. Prior to assembly of the gasketed MEA 650 the GIGs 651, 655 optionally include an adhesive liner that is removed during assembly of the MEA 650. After removal of the adhesive liner, the adhesive layers 612, 622 of the GIGs 651, 655 adhere to the surfaces of the CCM and/or in some configurations to each other to form the gasketed MEA 650.

In the example provided in FIG. 6, the first gasket layer 611, 621 and/or the second gasket layer 614, 624 of the GIGs 651, 655 include optional microstructured features 616, 626 to facilitate sealing between the GIG 651, 655 and the fuel flow plates 660, 661. Each of the flow field plates 660, 661 includes a field of gas flow channels 643 and ports through which hydrogen and oxygen fuels pass. In the configuration depicted in FIG. 6, flow field plates 660, 661 are configured as monopolar flow field plates. In other configurations, the flow field plates 660, 661 may comprise bipolar fluid flow plates to facilitate stacking multiple MEAs to achieve a desired voltage across the fuel cell stack.

Any suitable electrolyte membrane may be used in the practice of the present invention. Useful PEM thicknesses range between about 200 μm and about 15 μm. Copolymers of tetrafluoroethylene (TFE) and a co-monomer according to the formula: $FSO_2-CF_2-CF_2-O-CF(CF_3)-CF_2-O-CF=CF_2$ are known and sold in sulfonic acid form, i.e., with the $FSO_2^-$ end group hydrolyzed to $HSO_3^-$, under the trade name NAFION ® by DuPont Chemical Company, Wilmington, Delaware. NAFION ® is commonly used in making polymer electrolyte membranes for use in fuel cells. Copolymers of tetrafluoroethylene (TFE) and a co-monomer according to the formula: $FSO_2-CF_2-CF_2-O-CF=CF_2$ are also known and used in sulfonic acid form, i.e., with the $FSO_2^-$ end group hydrolyzed to $HSO_3^-$, in making polymer electrolyte membranes for use in fuel cells. Most preferred are copolymers of tetrafluoroethylene (TFE) and $FSO_2$—$CF_2CF_2CF_2CF_2$—O—$CF$=$CF_2$, with $FSO_2^-$ end group hydrolyzed to $HSO_3^-$. Other materials suitable for PEM construction are described in commonly owned U.S. Patent Publ. No. 2007/0059452 filed on Sep. 13, 2005 which is incorporated herein by reference.

In some embodiments, the catalyst layers may comprise Pt or Pt alloys coated onto larger carbon particles by wet chemical methods, such as reduction of chloroplatinc acid. This form of catalyst is dispersed with ionomeric binders, solvents, and often polytetrafluoroethylene (PTFL) particles to form an ink, paste, or dispersion that is applied either to the membrane or the GDLs.

In some embodiments, the catalyst layers may comprise nanostructured support elements bearing particles or nanostructured thin films (NSTF) of catalytic material. Nanostructured catalyst layers do not contain carbon particles as supports and therefore may be incorporated into very thin surface layers of the electrolyte membrane forming a dense distribution of catalyst particles. The use of NSTF catalyst layers allows much higher catalyst utilization than catalyst layers formed by dispersion methods, and offer more resistance to corrosion at high potentials and temperatures due to the absence of carbon supports. In some implementations, the catalyst surface area of a CCM may be further enhanced by embossing microstructured features onto an electrolyte membrane. The NSTF catalyst is coated onto a microstructured catalyst transfer substrate which upon lamination transfer of catalyst to the electrolyte membrane under heat and pressure causes the electrolyte membrane's surface to be micro-replicated. Methods and systems directed to microstructured catalyst transfer substrates are described in commonly owned U.S. Pat. No. 6,136,412 which is incorporated herein by reference. Various methods for making microstructured electrolyte membranes and NSTF catalyst layers are described in the following commonly owned patent documents which are incorporated herein by reference: U.S. Pat. Nos. 4,812,352 and 5,879,827, and U.S. Patent Publ. Nos. 2007/0059452 and 2008/0020923.

NSTF catalyst layers comprise elongated nanoscopic particles that may be formed by vacuum deposition of catalyst materials on to acicular nanostructured supports. Nanostructured supports suitable for use in the present invention may comprise whiskers of organic pigment, such as C.I. PIGMENT RED 149 (perylene red). The crystalline whiskers have substantially uniform but not identical cross-sections, and high length-to-width ratios. The nanostructured support whiskers are coated with coating materials suitable for catalysis, and which endow the whiskers with a fine nanoscopic surface structure capable of acting as multiple catalytic sites.

In certain implementations, the nanostructured support elements may be extended through continued screw dislocation growth. Lengthening and/or increasing the density of the nanostructured support elements allows for an increased surface area for catalysis. Processes for lengthening the nanostructured support elements are described in previously incorporated U.S. Patent Publ. No. 2007/0059452. Additionally, or alternatively, multiple layers of nanostructured support elements also provide for an increased surface area. Processes for producing multiple layers of nanostructured support elements are described in previously incorporated U.S. Patent Publ. Nos. and 2008/0020923. The nanostructured support elements are coated with a catalyst material to form a nanostructured thin film catalyst layer. According to one implementation, the catalyst material comprises a metal, such as a platinum group metal. In one embodiment, the catalyst coated nanostructured support elements may be transferred to a surface of an electrolyte membrane to form a catalyst coated membrane. In another embodiment, the catalyst coated nanostructured support elements may be formed on a GDL surface.

The GDLs can be any material capable of collecting electrical current from the electrode while allowing reactant gasses to pass through, typically a woven or non-woven carbon fiber paper or cloth. The GDLs provide porous access of gaseous reactants and water vapor to the catalyst and membrane, and also collect the electronic current generated in the catalyst layer for powering the external load.

GDLs may be any suitable electrically conductive porous substrate, such as carbon fiber constructions (e.g., woven and non-woven carbon fiber constructions). Examples of commercially available carbon fiber constructions include trade designated "AvCarb P50" carbon fiber paper from Ballard Material Products, Lowell, Mass.; "Toray" carbon paper which may be obtained from ElectroChem, Inc., Woburn, Mass.; "SpectraCarb" carbon paper from Spectracorp, Lawrence, Mass.; "AFN" non-woven carbon cloth from Hollingsworth & Vose Company, East Walpole, Mass.; and "Zoltek" carbon cloth from Zoltek Companies, Inc., St. Louis, Mo., and "U-105" carbon cloth from Mitsubishi Rayon Co., Tokyo, Japan. GDLs may also be treated to increase or impart hydrophobic properties. For example, GDLs may be treated with highly-fluorinated polymers, such as polytetrafluoroethylene (PTFE) and fluorinated ethylene propylene (FEP).

Figure 7A:
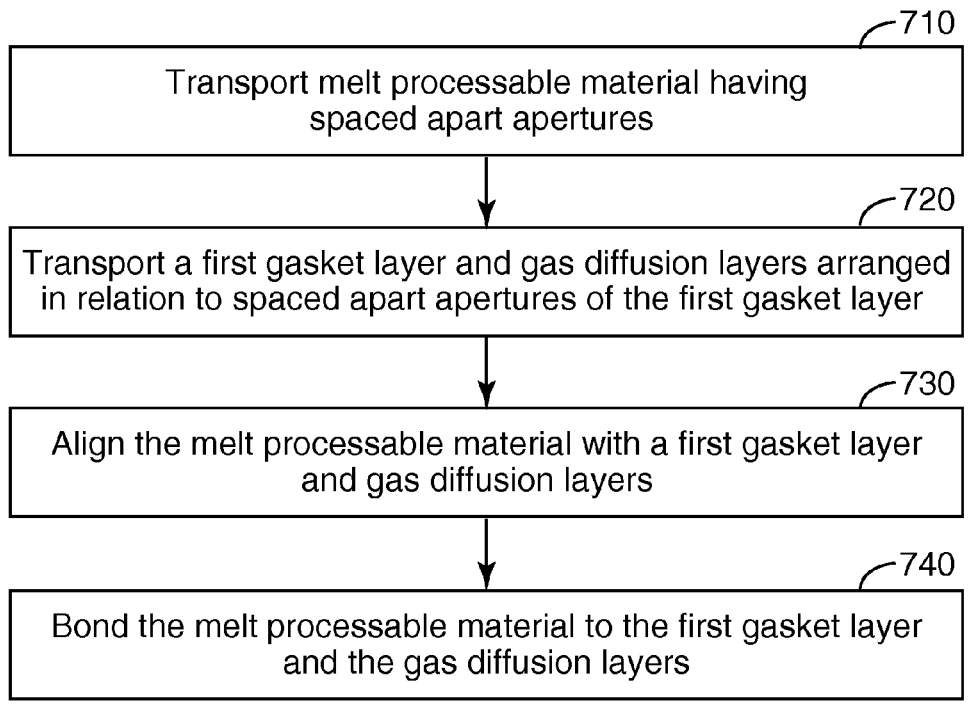
FIG. 7A is a diagram illustrating a process for fabricating a GIG subassembly web that uses a ladder structure of heat/pressure processable material to form the second gasket layer in accordance with embodiments of the invention.

Embodiments of the invention are directed to processes for fabricating roll good GIG and/or MEA subassembly webs as illustrated, for example, in FIGS. 3A, 3B and 5. FIG. 7A is a flow diagram illustrating a method that may be used to fabricate GIG subassembly webs comprising multiple GIGs in accordance with embodiments of the invention. The method involves movement of various material webs through the fabrication process. The process involves transporting 710 a web of a heat/pressure processable material having spaced apart apertures to a bonding station. Typically, the heat/pressure processable material having spaced apart apertures is a relatively fragile ladder structure which requires support during the fabrication process via a carrier web or conveyer. For example, in one embodiment, the heat/pressure processable material may be adhesively attached to a carrier web using a medium tack adhesive. The carrier web having the heat/pressure processable material disposed thereon may be delivered from an unwind wheel or other source. In another embodiment, the heat/pressure processable material may be supported and transported through portions of the fabrication process on a vacuum conveyor.

The process also involves transporting 720 a first gasket material having spaced apart apertures and GDLs to the bonding station. In one configuration, the GDLs are disposed within the apertures of the first gasket layer. The first gasket layer and the GDLs may be transported via a second carrier web or a conveyer as described above. The first gasket layer includes an adhesive layer which may comprise a high tack adhesive with an optional adhesive liner. The adhesive layer of the first gasket layer is used in the formation of a MEA subassembly web to attach the GIG subassembly to an electrolyte membrane or CCM.

In one implementation, the first gasket layer is oriented on a second carrier web adhesive layer/adhesive liner side down. The first gasket layer may adhere to the second carrier web via a low tack adhesive, for example. The GDLs are disposed on the carrier web within the apertures of the first gasket layer and may also be adhesively attached to the carrier web via the low tack adhesive.

The heat/pressure processable material and the first gasket layer and GDLs are aligned 730. For example, registration between the heat/pressure processable material and the first gasket layer and GDLs may be controlled to place the heat/pressure processable material onto the perimeter of the GDLs. In one embodiment, the heat/pressure processable material configured as a ladder-like web is aligned with the first gasket layer and GDLs so that the heat/pressure processable material covers the outer edges of the GDLs and the inner edges of the first gasket layer at the apertures of the first gasket layer. For example, the heat/pressure processable material may overlap the outer edges of the GDLs and/or the inner edges of the first gasket layer by about 1-2 mm, or other amount.

After alignment, heat and pressure are used to bond 740 the heat/pressure processable material to the first gasket layer and the GDLs. In one configuration, heat and pressure are applied to the heat/pressure processable material, first gasket layer, and GDLs via a pair of heated bonding rollers. The heat and pressure applied by the bonding roller forces the heat/pressure processable material into the edge and/or surface of the GDL and into the edge and/or surface of the first gasket layer. After bonding, the heat/pressure processable material forms a second gasket layer that attaches the first gasket layer to the GDLs. The surface of the bonding roller may have microstructure features on it (in negative) to develop microstructured features on the surface of the first and/or second gasket layers. The second carrier web, which may be attached to the first gasket layer and GDLs via a heat deactivated pressure sensitive adhesive, may be delaminated at a delamination station and removed. After bonding, the resulting roll good GIG subassembly web may be rolled up for future use or used immediately to form a gasketed MEA subassembly as described below.

Figure 7B:
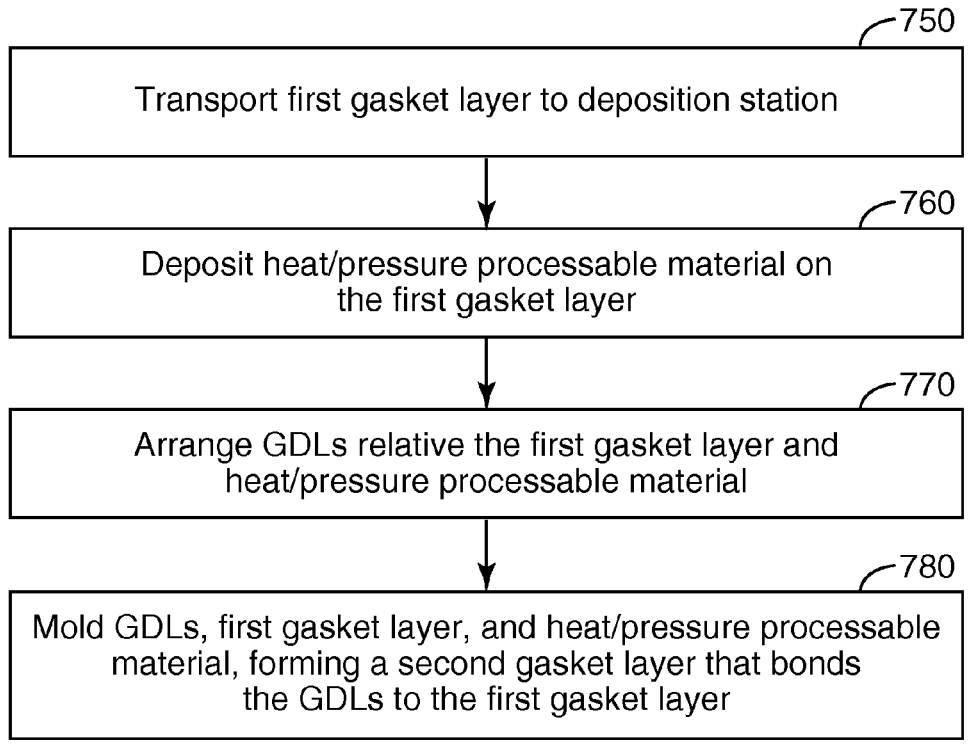
FIG. 7B is a diagram illustrating a process for fabricating a GIG subassembly web involves depositing a heat/pressure processable material on the first gasket layer and arranging the GDLs on the first gasket layer in accordance with embodiments of the invention.

FIG. 7B is a diagram illustrating a method that may be used to fabricate GIG subassembly webs comprising multiple GIGs in accordance with embodiments of the invention. The process illustrated in FIG. 7B uses a heat/processable gasket material deposited on the first gasket layer prior to the arrangement of the GDLs. The heat/processable gasket material may be deposited on the first gasket layer before cutting spaced apart apertures. Alternately, a first gasket layer web having spaced apart apertures is transported 750 to a deposition station, such as a silk screen printing station, where the heat/pressure processable material is deposited 760 on the first gasket layer. GDLs are arranged 770 relative to the first gasket layer web. The GDLs may be arranged so that they fit within apertures of the first gasket layer or the edges of the GDLs may overlap the edges of apertures. In some implementations, the edges of the GDLs may overlap the heat/pressure processable material. The heat/pressure processable material may be deposited on the first gasket layer so that it has a varying or gradient thickness. For example, the heat/pressure processable material may be deposited so that the heat/pressure processable layer is thinner under the GDLs compared to other regions. The GDLs, first gasket layer web having the heat/pressure processable material disposed thereon is molded 780 at a bonding station. The molding process forms a second gasket layer that bonds the first gasket layer to the GDLs.

Figure 8:
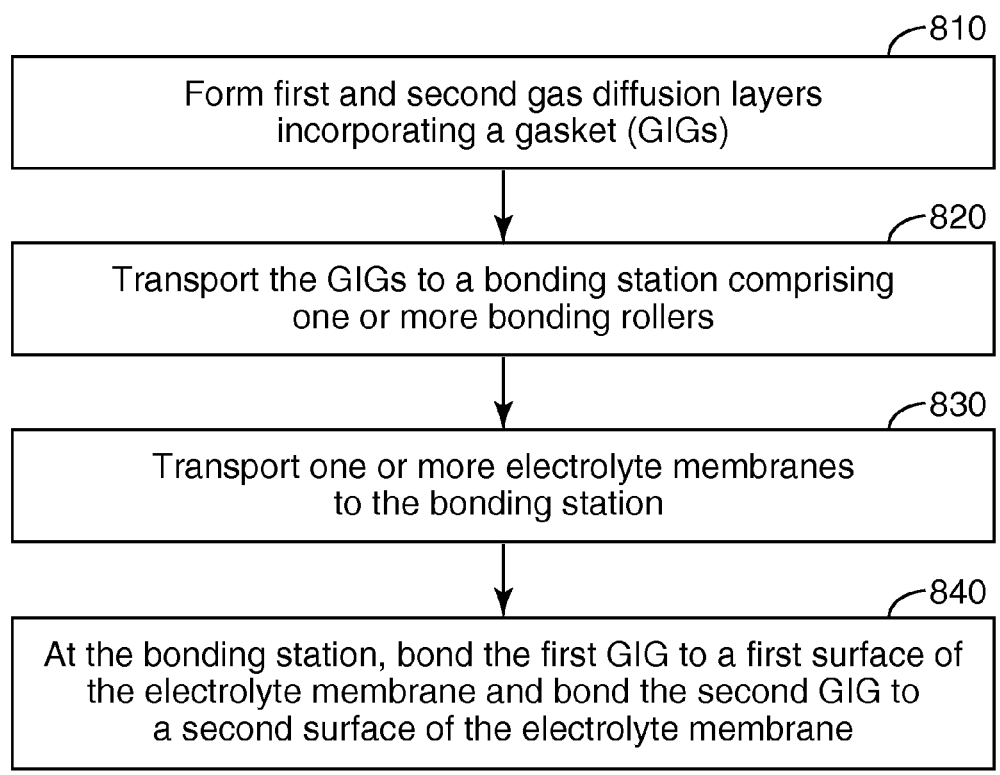
FIG. 8 is a flow diagram illustrating a process for fabricating an MEA subassembly web incorporating GIG subassembly webs in accordance with embodiments of the invention.

FIG. 8 is a flow diagram illustrating a method for fabricating gasketed MEA subassemblies in a continuous process using first and second GIG subassemblies fabricated 810 as described above. The first and second GIG subassemblies are transported 820 to a bonding station which may include multiple bonding rollers and/or another bonding apparatus. A catalyst coated electrolyte membrane or CCM web is also transported 830 to the bonding station.

As previously described formation of the GIG subassemblies may involve bonding GIG components under heat and pressure applied via bonding rollers. After bonding, a second carrier web used to facilitate transport of the GIG components is removed. In some embodiments, the second carrier web is attached to the GIG subassembly by a heat deactivated pressure sensitive adhesive. The second carrier web is removed from the GIG subassembly by a heat activated delamination process. Heat deactivated pressure sensitive adhesives may be composed of blends of immiscible materials. For example, the heat deactivated PSA may comprise hot-melt copolymer PSAs based on styrene-butadiene copolymers (SBS). The adhesive property of the PSA may not be permanently removed from heating, only during the time the web passes through the heated bonding roller so the GDL and first gasket delaminates from the second carrier web upon exiting the heated bonding roller.

The second carrier web is delaminated from each GIG subassembly exposing the adhesive layer of the first gasket layer If the first gasket layer includes an adhesive liner, the delamination process may optionally also remove the adhesive liner from the first gasket layer.

The first GIG subassembly web and the second GIG assembly web are bonded 840 to the electrolyte membrane web at the bonding station. In one embodiment, the adhesive layer of the first gasket layers of the GIGs comprises a high tack adhesive. The GIG subassembly webs are bonded to the catalyst coated electrolyte membrane or CCM via the high tack adhesive with the bonding rollers operating at room temperature. Bonding at room temperature avoids exposure of the electrolyte membrane and the catalyst due to higher temperatures which may cause degradation of the membrane and/or catalyst. In some embodiments, the bonding rollers apply both heat and pressure.

In some configurations, the electrolyte membrane may comprise a continuous elongated web without catalyst layers. In this configuration, the electrolyte membrane may be bonded without extensive alignment to GIG subassemblies that have catalyst disposed on the GDLs of the GIG subassemblies. In some configurations, a plurality of discrete electrolyte membranes with or without catalyst layers are carried on a continuous web and may be aligned with the GDLs of the GIG subassemblies prior to bonding. In other configurations, a continuous electrolyte membrane may comprise continuous anode and cathode catalyst layers disposed on opposite surfaces of the electrolyte membrane. In yet other configurations, the catalyst may be patterned on the surface of the continuous electrolyte membrane. The GIG subassemblies may be aligned with the catalyst patterns prior to bonding.

Figure 9:
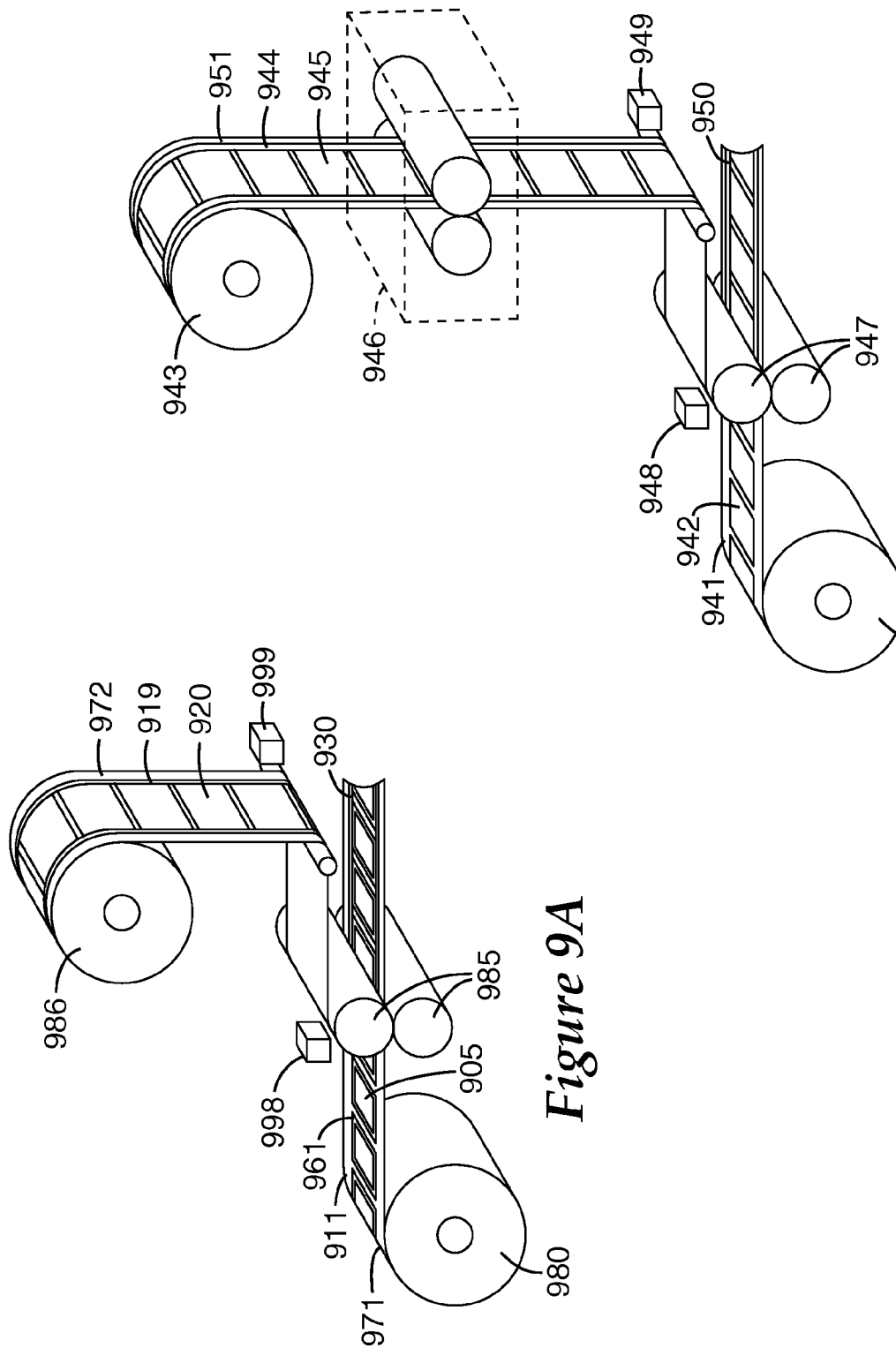
FIG. 9A depicts an apparatus that processes input webs of fuel cell materials and produces a roll good GIG subassembly web in accordance with embodiments of the invention.
FIG. 9B illustrates an apparatus that produces a roll good GIG subassembly web, the apparatus configured to deposit a heat/pressure processable material on a first gasket layer in accordance with embodiments of the invention.

Apparatuses that processes input webs of fuel cell materials and produces roll good fuel cell GIG subassemblies is illustrated in FIGS. 9A and 9B. In general terms, the apparatuses of FIGS. 9A and 9B can produce roll good GIG subassemblies using roll good fuel cell components. The apparatuses of FIGS. 9A and 9B provides a unique approach to fabricating a subassembly web comprising multiple GIGs in a continuous fuel cell manufacturing process.

Referring now to FIG. 9A, a heat/pressure processable material 919 formed as a ladder like structure is adhesively attached to a first carrier web 972. The first carrier web 972 and heat/pressure processable material 919 is delivered from a first unwind wheel 986 and is transported to bonding rollers 985.

A first gasket layer 911 having spaced apart apertures 961 is adhesively attached to a second carrier web 971. GDLs 905 are oriented within the spaced apart apertures 961 of the first gasket layer 911. The second carrier web 971 having the first gasket layer 911 and GDLs 905 disposed thereon is delivered from a second unwind wheel 980 and is transported to the bonding rollers 985.

Optical sensors 998, 999 may be used to align the heat/pressure processable material ladder 919 and the first gasket layer 911 and GDLs 905. Fiber optic sensors can, for example, detect the apertures 920 of the heat/pressure processable material ladder 919 relative to the apertures 961 of the first gasket layer 911 and/or the edges of the GDLs 905. In certain applications, alignment may be accomplished via detection of fiducial markings on the fuel cell component materials 911, 905, 919 or the carrier webs 971, 972.

Those skilled in the art will appreciate that several techniques and configurations can be employed to facilitate alignment using optical sensors or other types of sensing arrangements. By way of example, one or more optical sensors 998 can be positioned to detect fiducial markings on the first gasket layer 911 and/or second carrier web 971 and/or features of the first gasket layer 911 and/or GDLs 905 disposed thereon. A one or more second optical sensors 999 can be positioned to detect fiducial markings on the heat/pressure processable ladder 919 and/or first carrier web 972 and/or features of the heat/pressure processable material 919 disposed thereon. Information from the sensors 998, 999 is used by a control system to control the speed, longitudinal position, and/or transverse position of each carrier web 971, 972.

The first carrier web 972 having the heat/pressure processable ladder 919 disposed thereon and the second carrier web 971 having the first gasket layer 911 and GDLs 905 disposed thereon, after alignment, are brought together at the bonding rollers 985. The heat and pressure applied by the bonding rollers 985 causes the heat/pressure processable material 919 to flow over and/or into the surfaces and/or edges of the first gasket layer 911 and GDLs 905. After the bonding process, a second gasket layer is formed from the heat/pressure processable material 919. The second gasket layer attaches the first gasket layer 911 to the GDLs 905 forming a roll good GIG subassembly web 930. In some implementations, the second carrier web 971 is stripped away following bonding and the GIG subassembly web 930 is wound on a wind wheel for storage and/or later use in subsequent processing. In some implementations, the GIG subassembly is transported to another processing stage, such as a processing stage for formation of an MEA subassembly incorporating the GIG subassembly.

FIG. 9B illustrates an apparatus for forming a GIG in accordance with another embodiment. In this embodiment, the heat/pressure processable material used to form the second gasket layer is deposited on the first gasket layer 944 before positioning the GDLs. A first gasket layer 944 having spaced apart apertures 945 is delivered from a first unwind wheel 943 and is transported on a first carrier web 951 to a deposition station 946. At the deposition station, a heat/pressure processable material is deposited on the first gasket layer. For example, the heat/pressure processable material may be silk screen printed or otherwise deposited on the first gasket layer 944. GDLs 942 are disposed on a second carrier web 941 which is delivered from a second unwind wheel 940.

Information from optical or other type sensors 948, 949 may be used to align the first gasket layer 944 having the heat/pressure processable material disposed thereon and the GDLs 942 disposed on the second carrier web 941. As previously described, the sensors may detect features of the first gasket layer 944 and/or GDLs 942 and/or may detect fiducial markings on the webs 941, 951 to facilitate alignment, for example. The GDLs 942 are aligned relative to the first gasket layer 944. In some implementations, the GDLs 942 are aligned so that the GDLs 942 fit within the apertures 945 of the first gasket layer 944. In other implementations, the edges of the GDLs 942 overlap the edges of the apertures 945 of the first gasket layer 944. In these implementations, a portion of the heat/pressure processable material may be disposed between the first gasket layer 944 and the GDLs 942.

The first carrier web 951 having the first gasket layer 944 with the heat/pressure processable material disposed thereon and the second carrier web 941 transporting the GDLs 942, are brought together at the bonding rollers 947. The heat and/or pressure applied by the bonding rollers 947 causes the heat/pressure processable material to flow over and/or into the surfaces and/or edges of the first gasket layer 944 and GDLs 942. During the bonding process, a second gasket layer is formed from the heat/pressure processable material. The second gasket layer attaches the first gasket layer 944 to the GDLs 942, forming roll good GIG subassembly web 950.

Figure 10:
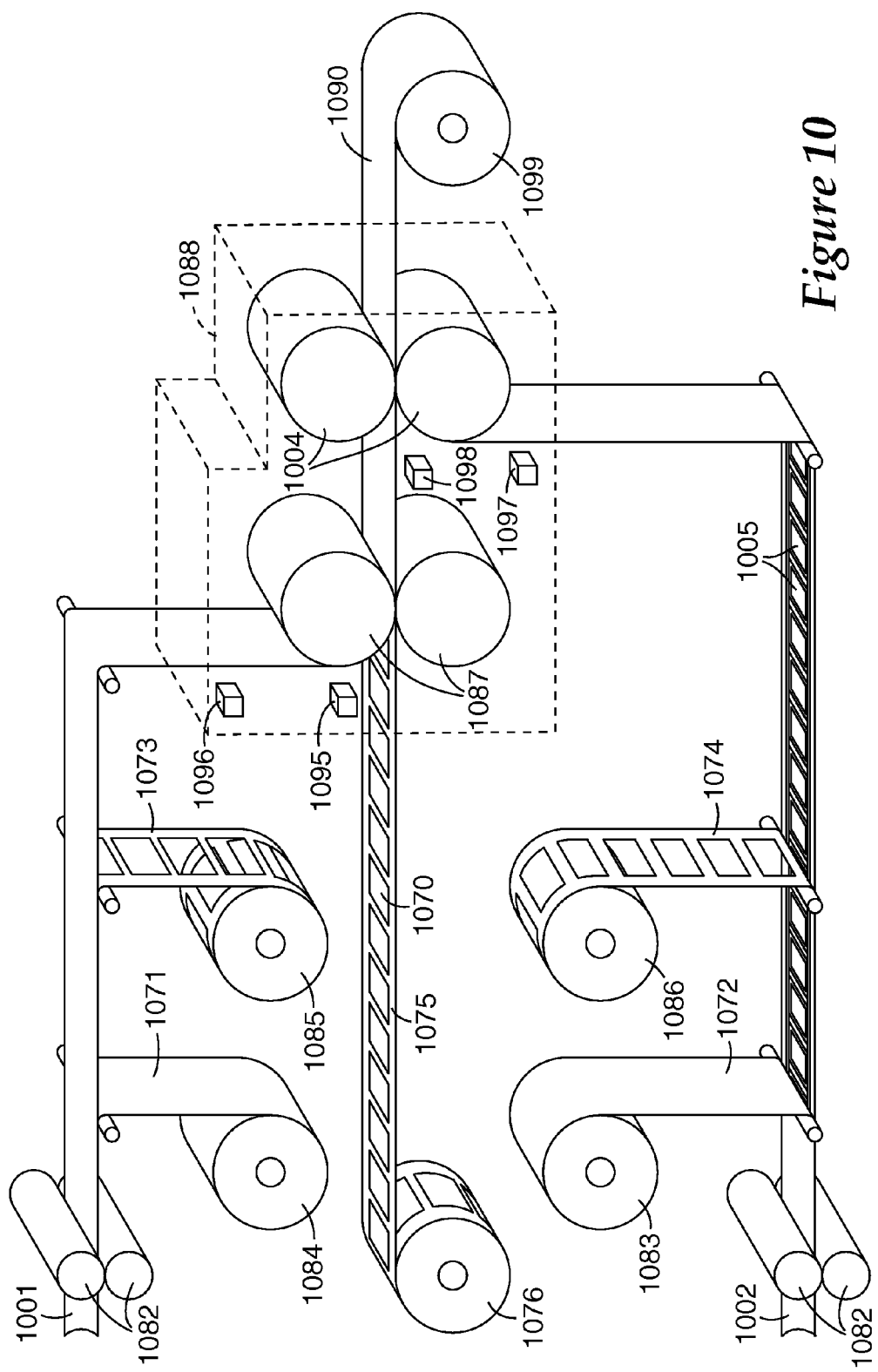
FIG. 10 depicts an apparatus that processes first and second GIG subassembly webs to produce an output roll good MEA subassembly web in accordance with embodiments of the invention.

The GIG subassemblies fabricated using the processes illustrated in FIGS. 9A or 9B may be used to form a gasketed MEA subassembly. FIG. 10 illustrates an apparatus that may be used to fabricate a gasketed MEA subassembly using two GIG subassemblies fabricated by the apparatus of FIG. 9A or 9B.

In some applications, two GIG subassemblies 1001, 1002 may be delivered to the apparatus of FIG. 10 directly from previous processing stations. In other applications, the roll good GIG subassemblies 1001, 1002 may be delivered from unwind wheels. The second carrier webs 1071, 1072 are delaminated from the first and second GIG subassemblies 1001, 1002 using delamination rollers 1081, 1082. The second carrier webs 1071, 1072 are stripped away from the GIG subassemblies 1001, 1002 and wound on waste wheels 1083, 1084. The adhesive liners 1073, 1074 of the adhesive layer of the GIG subassemblies 1001, 1002 are peeled away and are collected on waste wheels 1085, 1086.

An electrolyte membrane web 1075 is delivered from unwind wheel 1076. In some embodiments, as illustrated in FIG. 10, the electrolyte membrane web 1075 may comprise a continuous catalyst coated electrolyte membrane having patterned catalyst areas 1070. The electrolyte membrane web 1075 is transported to the bonding station 1088.

At the bonding station 1088, sensors 1095, 1096 facilitate alignment of the GDLs of the first GIG subassembly 1001 with the patterned catalyst areas 1070 on one surface of the electrolyte membrane subassembly 1075. The adhesive layer of the first GIG subassembly 1001 bonds the first GIG subassembly 1001 to the electrolyte membrane 1075 via pressure exerted by bonding rollers 1087. Sensors 1097, 1098 facilitate alignment of the GDLs 1005 of the second GIG subassembly 1002 with the patterned catalyst areas on a surface of the electrolyte membrane subassembly 1075. The adhesive layer of the second GIG subassembly 1002 bonds the second GIG subassembly 1002 to the electrolyte membrane 1075 via pressure exerted by bonding rollers 1004. In some embodiments, the first and second GIG subassemblies 1001, 1002 may be simultaneously bonded to opposite surfaces of the electrolyte membrane web 1075 using a single bonding stage, e.g., a single pair of bonding rollers. The resulting product is a gasketed MEA subassembly web 1090 which may be delivered directly to a subsequent processing step, or may be rolled up on a wind wheel 1099 as a roll good. For example, the gasketed MEA subassembly web 1090 may be used in a subsequent roll or sheet good process to make fuel cell stacks by integrating fluid flow plates or may be stored until ready for cutting into sheet goods or piece parts.

The foregoing description of the various embodiments of the invention has been presented for the purposes of illustration and description. It is not intended to be exhaustive or to limit the invention to the precise form disclosed. Many modifications and variations are possible in light of the above teaching. For example, the various rotary bonding processes described with reference to the accompanying figures can instead be accomplished using non-rotary methods and apparatuses, such as by use of step and repeat compression processes and apparatuses as are known in the art, for example. It is intended that the scope of the invention be limited not by this detailed description, but rather by the claims appended hereto.

What we claim is:

1. A method of making gas diffusion layer incorporating gasket (GIG) fuel cell subassemblies via a roll-to-roll process, comprising:
   transporting a material processable by one or both of heat and pressure and having spaced apart apertures to a bonding station;
   transporting a first gasket layer having gas diffusion layers arranged in relation to spaced apart apertures of the first gasket layer to the bonding station;
   aligning the heat/pressure processable material with the first gasket layer and the gas diffusion layers; and
   at the bonding station, bonding the heat/pressure processable material to the first gasket layer and the gas diffusion layers, the heat/pressure processable material, after bonding, forming a second gasket layer that attaches the gas diffusion layers to the first gasket layer,
   wherein each GIG fuel cell subassembly consists essentially of a gas diffusion layer, a first gasket layer, a second gasket layer, an adhesive layer, and optionally, a removable liner.

2. The method of claim 1, wherein aligning the heat/pressure processable material comprises aligning the apertures of the heat/pressure processable material with the apertures of the first gasket layer so that the heat/pressure processable material overlaps at least a portion of the first gasket layer and gas diffusion layers.

3. The method of claim 1, wherein the gas diffusion layers are disposed within the spaced apart apertures of the first gasket layer.

4. The method of claim 1, wherein the gas diffusion layers overlap the first gasket layer.

5. The method of claim 1, wherein:
   transporting the heat/pressure processable material comprises transporting the heat/pressure processable material on a first carrier web; and
   transporting the first gasket layer and the gas diffusion layers comprises transporting the first gasket layer and the gas diffusion layers on a second carrier web.

6. The method of claim 5, wherein a first adhesive adheres the heat/pressure processable material to the first carrier web and a second adhesive adheres the gas diffusion layers and the first gasket layer to the second carrier web.

7. The method of claim 6, wherein the second adhesive comprises a heat deactivated pressure sensitive adhesive.

8. The method of claim 5, further comprising removing the second carrier web from the gas diffusion layers and the first gasket layer, wherein removing the second carrier web exposes an adhesive layer or an adhesive liner of the first gasket layer.

9. The method of claim 6, wherein:
   removing the second carrier web exposes the adhesive liner; and
   further comprising removing the adhesive liner from the adhesive layer of the first gasket layer.

10. The method of claim 1, wherein bonding the heat/pressure processable material to the gas diffusion layers and the first gasket layer comprises applying at least one of heat and pressure to the heat/pressure processable material via bonding rollers in a continuous process.

11. The method of claim 1, wherein the gas diffusion layers comprise catalyst coated gas diffusion layers.

12. A method of forming membrane electrode assemblies via a roll-to-roll process, comprising:
   forming first and second gas diffusion layer incorporating a gasket (GIG) subassemblies, wherein each GIG subassembly consists essentially of a gas diffusion layer, a first gasket layer, a second gasket layer, an adhesive layer, and optionally, a removable liner, the formation of each GIG subassembly comprising:
      transporting a material processable by one or both of heat and pressure having spaced apart apertures to a bonding station;
      transporting a first gasket layer having gas diffusion layers arranged in relation to spaced apart apertures of the first gasket layer to the bonding station;
      aligning the heat/pressure processable material with the first gasket layer and the gas diffusion layers;
      at the bonding station, bonding the heat/pressure processable material to the first gasket layer and the gas diffusion layers, the heat/pressure processable material, after bonding, forming a second gasket layer that attaches the gas diffusion layers to the first gasket layer; and
      exposing an adhesive layer on the first gasket layer;
   delivering one or more electrolyte membranes;
   bonding the first GIG subassembly to a surface of the one or more electrolyte membranes; and
   bonding the second GIG subassembly to an opposite surface of the one or more electrolyte membranes.

13. The method of claim 12, wherein the one or more electrolyte membranes are at least partially catalyst coated.

14. The method of claim 12, wherein the gas diffusion layers of the first and second GIGs are at least partially catalyst coated.

15. The method of claim 12, wherein the one or more electrolyte membranes comprises a continuous electrolyte membrane.

16. The method of claim 12, wherein:
   delivering the one or more electrolyte membranes comprises delivering a plurality of electrolyte membranes;
   bonding the first GIG subassembly comprises aligning the first subassembly with the plurality of electrolyte membranes; and
   bonding the second GIG subassembly comprises aligning the second subassembly with the plurality of electrolyte membranes.

17. The method of claim 12, wherein
   the one or more electrolyte membranes comprise an electrolyte membrane web having patterned catalyst areas;
   bonding the first GIG subassembly comprises aligning the first GIG subassembly with the patterned electrolyte membrane web; and
   bonding the second GIG subassembly comprises aligning the second GIG subassembly with the patterned electrolyte membrane web.

18. The method of claim 12, wherein:
bonding the first GIG subassembly to the electrolyte membrane comprises bonding the first GIG subassembly to the electrolyte membrane via the adhesive layer of the first GIG subassembly; and
bonding the second GIG subassembly to the electrolyte membrane comprises bonding the second GIG subassembly to the electrolyte membrane via the adhesive layer of the second GIG subassembly.

19. The method of claim 18, wherein:
the adhesive layer of at least one of the first and second GIG subassemblies comprises an adhesive liner; and
further comprising removing the adhesive liner prior to bonding.

20. The method of claim 18, wherein bonding the first and second GIG subassemblies to the electrolyte membrane comprises bonding the first and second GIG subassemblies to each other via their respective adhesive layers.

21. The method of claim 12, further comprising:
removing the optional removable liner of the first GIG subassembly;
removing the optional removable liner of the second GIG subassembly; and
cutting the electrolyte membrane having the first and second GIG subassemblies bonded thereto into individual membrane electrode assemblies.

22. The method of claim 12, wherein bonding the heat/pressure processable material to the gas diffusion layers and the first gasket layer comprises applying one or both of heat and pressure to the heat/pressure processable material, the gas diffusion layers and the first gasket layer via bonding rollers in a continuous process.

23. The method of claim 12, wherein:
bonding the first GIG subassembly to the electrolyte membrane comprises applying one or both of heat and pressure to the first GIG subassembly and the electrolyte membrane via a first set of rollers in a continuous process; and
bonding the second GIG subassembly to the electrolyte membrane comprises applying one or both of heat and pressure to the second GIG subassembly and the electrolyte membrane via a second set of rollers in the continuous process.

24. A method of making gas diffusion layer incorporating a gasket (GIG) fuel cell subassemblies, comprising:
transporting a first gasket layer having spaced apart apertures to a deposition station;
depositing a heat/pressure processable material on the first gasket layer;
aligning the first gasket layer having the heat/pressure processable material disposed thereon with gas diffusion layers; and
at a bonding station, bonding the heat/pressure processable material to the first gasket layer and the gas diffusion layers, the heat/pressure processable material, after bonding, forming a second gasket layer that attaches the gas diffusion layers to the first gasket layer, wherein each GIG fuel cell subassembly consists essentially of a gas diffusion layer, a first gasket layer, a second gasket layer, an adhesive layer, and optionally, a removable liner.

25. The method of claim 24, wherein aligning the first gasket layer having the heat/pressure processable material disposed thereon with the gas diffusion layers comprises arranging the gas diffusion layers within the apertures of the first gasket layer.

26. The method of claim 24, wherein aligning the first gasket layer having the heat/pressure processable material disposed thereon with the gas diffusion layers comprises arranging the gas diffusion layers so that the gas diffusion layers overlap the heat/pressure processable material.

27. The method of claim 24, wherein depositing the heat/pressure processable material on the first gasket layer comprises silk screen printing the heat/pressure processable material on the first gasket layer.

* * * * *

UNITED STATES PATENT AND TRADEMARK OFFICE
CERTIFICATE OF CORRECTION

PATENT NO. : 8,012,284 B2  
APPLICATION NO. : 11/611564  
DATED : September 6, 2011  
INVENTOR(S) : Mark Kevitt Debe Page 1 of 1

It is certified that error appears in the above-identified patent and that said Letters Patent is hereby corrected as shown below:

Column 11
Line 4, delete "$CF_2CF_2$" and insert in place thereof -- $CF_2CF_2$ --.

Line 4, after "with" insert -- the --.

Line 13, delete "(PTFL)" and insert in place thereof -- (PTFE) --.

Signed and Sealed this
First Day of May, 2012

David J. Kappos
*Director of the United States Patent and Trademark Office*